Oct. 18, 1966

M. KAPEKER 3,279,199

DEFLECTOR UNIT FOR FREEZE DRYER

Filed April 25, 1963

INVENTOR.
MARTIN KAPEKER
BY
S.B. Schlessel
ATTORNEY

United States Patent Office
3,279,199
Patented Oct. 18, 1966

1

3,279,199
DEFLECTOR UNIT FOR FREEZE DRYER
Martin Kapeker, Brooklyn, N.Y., assignor to Thermovac Industries Corp., Copiague, N.Y., a corporation of New York
Filed Apr. 25, 1963, Ser. No. 275,740
7 Claims. (Cl. 62—55.5)

This invention relates to freeze drying and has for its objective the creation of a deflector unit which operates to deflect water vapor drawn from organic materials being dehydrated directly to the cold wall of the freeze chamber of the freeze dryer, where it promptly condenses to a solid state, thus preventing the vapor and condensing liquid from reaching and entering the inlet line of the vacuum pump to interfere with the efficient operation of the apparatus and of the vacuum pump.

In the course of the operation of conventional freeze dryers, the water vapor and subsequent condensate, which is drawn from the materials being dehydrated in the process, are drawn into the chamber containing the vacuum inlet line by the action of the vacuum pump. Without adequate protection the vapor and liquid are drawn into the inlet line of the vacuum pump, and into the pump itself, destroying the efficiency of the pump and often causing damage. The condensation of this vapor and liquid into ice upon and within the inlet line clogs the line and reduces effective operation of the freeze drying apparatus. The formation of ice upon and within the drain line of the apparatus also impairs its effectiveness.

It is therefore the principal object of my invention to provide a deflector unit for a freeze dryer which is adapted to deflect water vapor directly upon the walls of the freeze chamber for rapid condensation to a solid state.

Another important object of my invention lies in the provision of a deflector unit which is adapted to be superposed over the inlet line of the vacuum pump of a freeze dryer to prevent entry of water vapor, liquid or ice into the inlet line.

A third important object of my invention lies in the provision of a deflector unit for a freeze dryer which is adapted to prevent clogging of the drain line thereof.

A fourth important object of my invention lies in the provision of a deflector unit which is inexpensive to manufacture and simple to install.

Still another important object of my invention lies in the creation of a deflector unit which can be readily removed for cleaning, and replaced with a minimum of time and effort.

These and other salient objects, advantages and functional features of my invention, together with the novel features of construction, composition and arrangement of parts, will be more readily apparent from an examination of the following description, taken with the accompanying drawings, wherein.

Similar reference characters designate similar parts throughout the different views.

Figure 1:
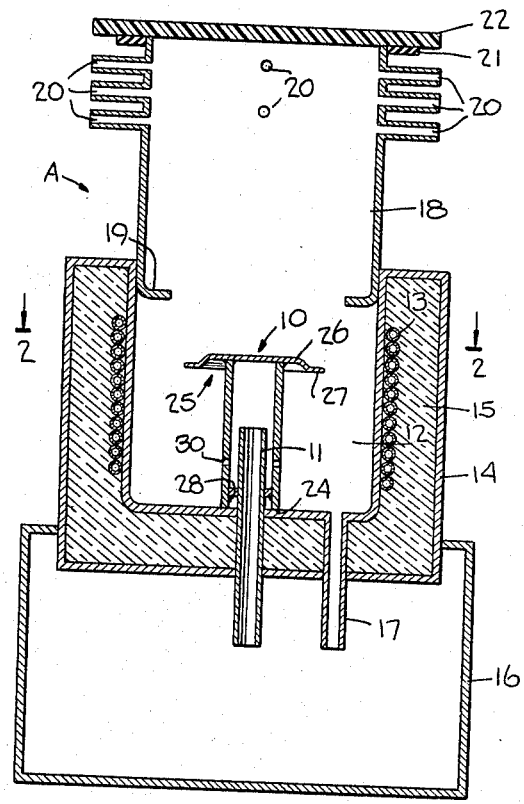
FIG. 1 is a cross-sectional view of a freeze dryer provided with a preferred embodiment of my invention.

Illustrative of the embodiment shown, FIG. 1 shows the deflector unit 10 seated upon the inlet line 11 of a vacuum pump (not shown), disposed vertically within the central or freeze chamber 12 of the freeze dryer A. Evaporator coils 13 are disposed around the chamber 12 and connected to a refrigeration circuit (not shown), to provide refrigeration for the chamber 12 and the apparatus. An outer shell 14 is provided around the chamber 12, and insulation material 15 is disposed between the chamber 12 and the outer shell 14 to insulate the chamber 12. The shell 14 and chamber 12 are seated upon a housing 16 which is adapted to contain the vacuum pump (not shown), to which the inlet line 11 runs. A drain line 17 opens into the floor of the chamber 12 and leads into the housing 16 for ultimate disposal of water and waste material.

A manifold 18 is provided integral with the chamber 12, separated therefrom by a peripheral ledge 19 adapted to support a tray (not shown), when desired to freeze materials within the chamber 12 or manifold 18. The upper wall of the manifold 18 is provided with a plurality of ports 20 by means of which flasks of material to be dehydrated are connected to the freeze dryer A, as is well known in the art. A gasket 21 is provided around the upper edge of the manifold 18, extending slightly above this edge, and a lid or cover 22, of clear plastic or similar material, is seated upon the gasket 21 to form a seal for the manifold 18 by vacuum suction, while exposing to view the interior of the manifold 18 and the chamber 12.

The deflector unit 10 comprises a cylinder 23 open at its base 24 and provided with an enlarged integral cap 25 at its upper end. The cap 25 is preferably circular and formed to provide an angle between its central portion 26 and peripheral lip 27. It is to be understood that the cap 25 may have a flat surface instead of curved, or arcuate, depending upon the shape or design of the freeze dryer and inner chamber 12, the shape provided being the most favorable for maximum deflection of water vapor drawn from the flasks of material being dehydrated. It should, however, for best results, extend to cover most of the area of the chamber 12 within the area of the ledge 19, so that all water vapor drawn into the chamber 12 will strike the cap 25, and so be deflected to the walls of the chamber 12, which present the coldest surfaces in the chamber 12.

Figure 3:
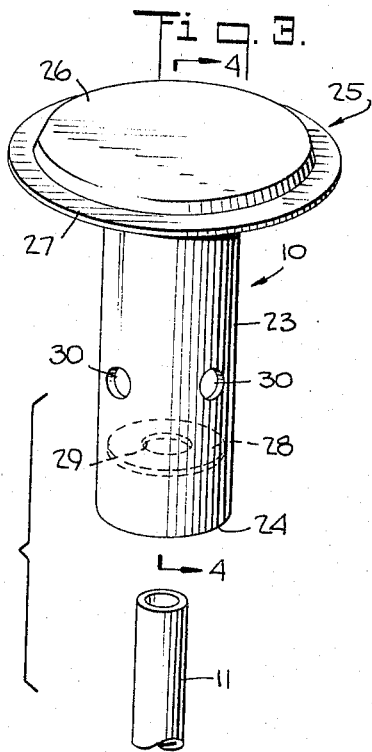
FIG. 3 is an enlarged top perspective view of the deflector unit and a portion of the inlet line of the vacuum pump.
Figure 2:
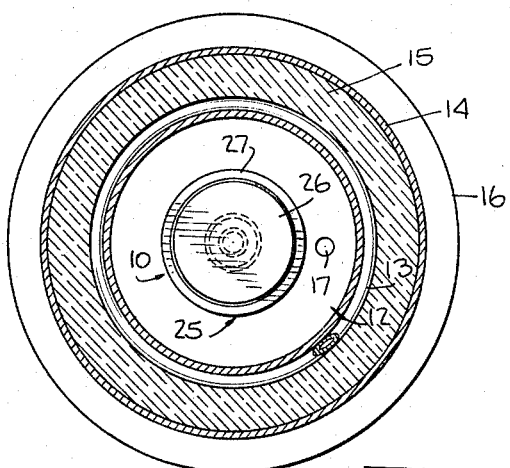
FIG. 2 is a cross-sectional view taken on lines 2—2 of FIG. 1.
Figure 4:
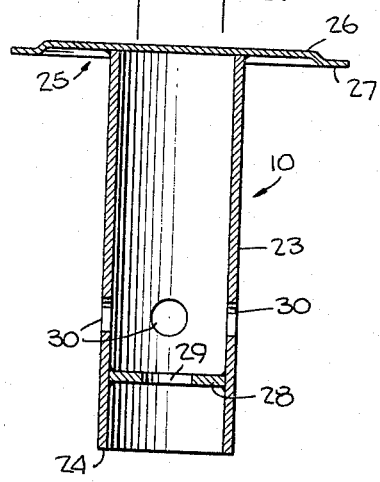
FIG. 4 is a cross-sectional view taken on lines 4—4 of FIG. 3.

Referring now to FIGS. 3 and 4, the cylinder 23 is provided with an integral ring 28 near its base 24, the ring 28 being provided with a central opening 29 at least equal in diameter to, but not substantially greater than, the outer diameter of the inlet line 11, so that the deflector unit 10 can be seated firmly around and upon the inlet line 11 in an upright position, as shown by FIG. 1, with its base 24 against the floor of the chamber 12. A plurality of openings 30 are provided in the wall of the cylinder 23 above the ring 28 but below the open end of the inlet line 11, as shown in FIG. 1.

In the operation of the freeze dryer, the flasks containing the organic matter to be dehydrated are secured to the ports 20 of the manifold 18. The refrigeration circuit and the vacuum pump are activated to create a low temperature (at least —60° F.), and a high vacuum within the freeze dryer to withdraw the air and water vapor from within the flasks and manifold 18, and to sublimate the liquid contents of the flasks. The water or liquid contents of the organic materials being dehydrated are frozen to the flasks and are thus withdrawn from the flasks into the manifold 18 in the form of vapor (process of sublimation), and from the manifold 18 into the chamber 12, being drawn, as is well apparent, in the direction of the inlet line 11 of the vacuum pump. As the water vapor is drawn into the chamber 12, by the suction of the vacuum pump, it is prevented from entering the inlet line 11 by striking the cap 25 of the deflector unit 10, which deflects it to the frozen wall of the chamber 12, where it condenses rapidly into solid ice. Such vapor as may not be entirely deflected to the wall of the chamber 12 is prevented from entering the inlet line 11 by the arrangement of openings 30 in the unit 10 being below the opening of the inlet line 11, so that, for practical purposes, no water vapor can enter the inlet line 11, and all other gases withdrawn from the organic material being dehydrated are allowed to be sucked into the vacuum pump through the inlet line 11, and out of the apparatus A.

In the process, since the water vapor must pass the entire line of evaporator coils 13 encircling the chamber 12 before reaching the inlet line 11, the water vapor must freeze to some part of the wall of the chamber 12 before it can reach the inlet line 11.

In the sublimation process which occurs by the operation of the freeze dryer A to dehydrate the organic materials, the liquid contents of the material passes directly from a solid state to a gaseous or vapor state, and condenses from this gas or vapor back to a solid state without apparently liquifying. To do so there must be maintained at all times an extremely low temperature and a high vacuum. Where the vapor does not pass directly to an extremely low temperature area liquifaction occurs before solidification into ice. Since the coldest part of the chamber 12 is its wall, the deflector unit 10 is thus particularly designed and adapted to accelerate sublimation by throwing the water vapor directly against the wall of the chamber 12, where it quickly freezes into a solid state, thus preventing it from otherwise liquifying and thereby more easily reaching the inlet line 11, and the drain line 17, thereafter solidifying to clog them, or passing through into the vacuum pump itself to effect its efficiency.

Following completion of the dehydrating process, the accumulation of ice within the chamber 12 is quickly and easily removed by defrosting the apparatus A, so that the melted ice runs down the drain 17. The deflector unit 10 is easily cleaned, when necessary, by lifting the cover 22 from the manifold 18 and lifting out the unit 10. The unit 10 may thereafter be replaced to its original position on the inlet line 11, and the cover 22 replaced.

In the embodiment shown by way of illustration, low temperature is obtained by the use of evaporator coils refrigeration system. As a substitute therefore, Dry Ice or other freezing compound may be installed within the shell 14 in front of the insulation 15.

As is well apparent, the embodiment thus shown and described is by way of illustration and not of limitation, and various changes may be made in the construction, composition and arrangement of parts without limitation upon or departure from the spirit and scope of the invention, or sacrificing any of the advantages thereof inherent therein, all of which are claimed.

Having described my invention, I claim:

1. In a freeze dryer comprising a manifold provided with a plurality of ports, refrigeration means, a freeze chamber and the inlet line of a vacuum pump leading into the freeze chamber through the base thereof and disposed vertically therein; the improvement which comprises a deflector unit superposed upon and around the inlet line, the deflector unit comprising a hollow body portion provided with an integral cap disposed upon and at right angles to the body portion and adapted to deflect vapor drawn from the manifold to the walls of the freeze chamber, and a plurality of openings in the walls of the body portion, the openings being disposed below the open end of the inlet line.

2. In a freeze dryer comprising a manifold provided with a plurality of ports, refrigeration means, a freeze chamber and the inlet line of a vacuum pump leading into the freeze chamber through the base thereof and disposed vertically therein; the improvement which comprises a deflector unit superposed upon and around the inlet line within the freeze chamber, the deflector unit comprising a hollow cylindrical body portion provided with an integral cap disposed upon and at right angles to the body portion and adapted to deflect vapor drawn from the manifold to the walls of the freeze chamber, and a plurality of openings in the wall of the body portion disposed below the open end of the inlet line.

3. A deflector unit as described in claim 2, the cap being substantially greater in diameter than the wall of the body portion.

4. A deflector unit, as claimed in claim 3, the cap portion comprising a substantially domed central portion provided with a peripheral lip.

5. A deflector unit, as claimed in claim 3, the cap portion comprising a flat disc.

6. A deflector unit as described in claim 2, the body portion being further provided with internal means below the wall openings to secure the unit to the inlet line of the vacuum pump.

7. A deflector unit as described in claim 6, the internal securing means comprising an integral ring adapted to frictionally engage the wall of the inlet line of the vacuum pump.

References Cited by the Examiner
UNITED STATES PATENTS

| | | | |
|---|---|---|---|
| 663,099 | 12/1900 | Reynolds | 55—462 X |
| 1,970,956 | 8/1934 | Elser | 34—5 |
| 2,163,996 | 6/1939 | Flosdorf | 34—5 |
| 2,212,429 | 8/1940 | Yutzler | 55—462 X |
| 2,380,339 | 7/1945 | Siedentopf | 34—5 |
| 2,582,250 | 1/1952 | Hershberg et al. | 34—5 |
| 2,731,734 | 1/1956 | Bancroft | 34—5 |

ROBERT A. O'LEARY, *Primary Examiner.*

NORMAN YUDKOFF, *Examiner.*

F. E. DRUMMOND, W. E. WAYNER,
*Assistant Examiners.*